US008269875B2

(12) United States Patent
Sato

(10) Patent No.: US 8,269,875 B2
(45) Date of Patent: *Sep. 18, 2012

(54) PORTABLE INFORMATION TERMINAL AND IMAGE MANAGEMENT PROGRAM

(75) Inventor: Shunta Sato, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 12/923,423

(22) Filed: Sep. 21, 2010

(65) Prior Publication Data

US 2011/0007180 A1   Jan. 13, 2011

Related U.S. Application Data

(63) Continuation of application No. 11/523,624, filed on Sep. 20, 2006, now Pat. No. 7,821,545.

(30) Foreign Application Priority Data

Sep. 26, 2005   (JP) ................................ 2005-278724

(51) Int. Cl.
*H04N 5/228* (2006.01)
*H04N 5/222* (2006.01)
*G09G 5/00* (2006.01)

(52) U.S. Cl. ......... 348/333.01; 348/333.11; 348/333.12; 348/333.05; 345/619

(58) Field of Classification Search ............... 348/222.1, 348/333.11, 333.12, 333.05; 345/619
See application file for complete search history.

(56) References Cited

U.S. PATENT DOCUMENTS

| | | | |
|---|---|---|---|
| 6,188,432 B1 | 2/2001 | Ejima | |
| 6,327,437 B1 | 12/2001 | Malloy Desormeaux | |
| 6,636,262 B1 | 10/2003 | Okajima et al. | |
| 6,765,618 B1 | 7/2004 | Sato | |
| 7,027,728 B2 | 4/2006 | Goris et al. | |
| 7,248,796 B2 | 7/2007 | Triteyaprasert et al. | |
| 2001/0012072 A1 | 8/2001 | Ueno | |
| 2005/0134719 A1 | 6/2005 | Beck | |
| 2006/0028574 A1 | 2/2006 | Lee | |

FOREIGN PATENT DOCUMENTS

| | | |
|---|---|---|
| JP | 05-037940 A | 2/1993 |
| JP | 08-331495 A | 12/1996 |
| JP | 2000-224465 | 8/2000 |
| JP | 2001-094862 A | 4/2001 |
| JP | 2004-328283 | 11/2004 |
| JP | 2005-056390 A | 3/2005 |
| WO | WO-2005/015355 A2 | 2/2005 |

OTHER PUBLICATIONS

Search Report of European Application No. 06120800.5 dated Feb. 13, 2007, 7 pages (EPO).
Bongwon Suh et al., "*Automatic Thumbnail Cropping and its effectiveness*" UIST '03, Proceedings of the 16th Annual ACM Symposium on User interface Software and Technology, Vancouver, B.C., Canada, Nov. 2-5, 2003, ACM Symposium on User Interface Software and Technology, New York, NY, ACM, US, 2003, vol. 5, Issue 2, pp. 95-104, ISBN: 1-58113-636-6.
Office Action of Japanese Application. No. 2005-278724 dated Jan. 28, 2009, 2 pages (Japan).

*Primary Examiner* — Chieh M Fan
*Assistant Examiner* — Quang Le
(74) *Attorney, Agent, or Firm* — Rader Fishman & Grauer, PLLC

(57) ABSTRACT

A portable information terminal and an image management program are provided. A portable information terminal includes: a display part which has a screen capable of displaying at least an image; an in-focus value computing part which computes an in-focus value from an original image; an image cutting part which cuts a thumbnail image from the original image based on the in-focus value computed at the in-focus value computing part; a data storage part which stores data of the thumbnail image cut at the image cutting part; and a control part which reads the data of the thumbnail image stored in the data storage part as necessary and displays it on a screen of the display part.

21 Claims, 7 Drawing Sheets

PORTABLE INFORMATION TERMINAL AND IMAGE MANAGEMENT PROGRAM

CROSS REFERENCES TO RELATED APPLICATIONS

This is a Continuation Application of U.S. patent application Ser. No. 11/523,624, filed Sep. 20, 2006, which in turn claims priority from Japanese Application No.: 2005-278724, filed on Sep. 26, 2005, the entire contents of which are incorporated herein by reference.

BACKGROUND OF THE INVENTION

1. Field of the Invention

The present invention relates to a portable information terminal which can show an image list on a display device mounted thereon, and an image management program which creates a thumbnail image from an original image and displays it in a list.

2. Description of the Related Art

Before, in an image list representation application, a taken image or an image stored in a storage is scaled down, and is formed in a thumbnail image, and thumbnail images are listed and displayed on the screen of a display device.

In addition, in the case in which thumbnail images are listed and displayed on the screen of a display device mounted on a cellular telephone terminal, the size and resolution of thumbnail images are also scaled down in accordance with the screen size and resolution of the display device, and thus the images are really difficult to see.

Here, in the Publication of unexamined patent application JP-A-2000-224465 (Patent Reference 1), a technique is disclosed in which a digital still camera is provided with a sight-line detecting part which detects the convergent point of the sight of a user, the essential area in a taken image is specified based on information about the convergent point of the sight of the user detected by the sight-line detecting part, that is, it is made possible to specify on which area in the taken image the photographer focuses, and such a process is performed that the resolution is increased or the compression ratio is reduced with respect to the image of the essential area, whereby an image easy to see can be created and on which the photographer's intention is reflected.

In addition, in the Publication of unexamined patent application JP-A-2004-328283 (Patent Reference 2), a technique is disclosed in which a portion is calculated at which a focal point is obtained in an image, the compression ratio of the portion at which the focal point is obtained is more reduced than the compression ratio of the other portions, and whereby the deterioration of image quality is decreased, which is caused by scaling down an original image.

Patent Reference 1: JP-A-2000-224465 (FIGS. 1, 2 and 5)
Patent Reference 2: JP-A-2004-328283 (FIGS. 1 and 2)

SUMMARY OF THE INVENTION

However, it is difficult to adapt the technique described in the Publication of unexamined patent application JP-A-2000-224465 to a cellular telephone terminal, for example. More specifically, for example, in the technique described in the publication, the construction of the sight-line detecting part which detects the convergent point of sight of the user is necessary, and it is difficult to mount such construction on the cellular telephone terminal. In addition, even though the technique described in the publication is adapted to improve the image quality of the essential area on which the photographer focuses, images listed on a small screen of a display device mounted on the cellular telephone terminal are not made easy to see so much. In addition to this, for example, since the convergent point of sight is unknown in the case of an image obtained from outside, the essential area itself cannot be specified.

Similarly, also in the case in which the technique described in the Publication of unexamined patent application JP-A-2004-328283 is adapted to the cellular telephone terminal, for example, it is difficult to make images easy to see that are listed on the screen of the display device of the cellular telephone terminal. More specifically, the technique described in the publication can suppress the deterioration of image quality in scaling down the original image, but it cannot make images easy to see so much that are listed on a small screen of the display device mounted on the cellular telephone terminal.

It is desirable to provide a portable information terminal and an image management program which allow images to be made easy to see that are listed on the screen of a display device, such as a display device mounted on a cellular telephone terminal that the screen size is small and the resolution is not so high.

A portable information terminal according to an embodiment of the invention solves the above problems by providing a portable information terminal including: a display part which has a screen capable of displaying at least an image; an in-focus value computing part which computes an in-focus value from an original image; an image cutting part which cuts a thumbnail image from the original image based on the in-focus value computed at the in-focus value computing part; a data storage part which stores data of the thumbnail image cut at the image cutting part; and a control part which reads the data of the thumbnail image stored in the data storage part as necessary and displays it on a screen of the display part.

In addition, an image management program according to an embodiment of the invention solves the problems by providing an image management program which allows a portable information terminal to function as: an in-focus value computing part which computes an in-focus value from an original image; an image cutting part which cuts a thumbnail image from the original image based on the in-focus value computed at the in-focus value computing part; a storage control part which stores data of the thumbnail image cut out at the image cutting part in a data storage part; and a display control part which reads the data of the thumbnail image stored in the data storage part as necessary and displays it on a screen of a display part.

More specifically, the in-focus area in the original image is highly likely to be a target for shooting when an image is taken, and is the characteristic portion in the original image. In an embodiment of the invention, the in-focus area (the characteristic portion in the original image) is cut out of the original image as a thumbnail image.

DETAILED DESCRIPTION OF THE INVENTION

Hereinafter, an embodiment of a portable information terminal and an image management program will be described with reference to the drawings.

In addition, in the embodiment, a cellular telephone terminal is taken as an exemplary portable information terminal according to an embodiment of the invention. However, of course, the descriptions explained here are only examples, and it is without saying that the invention is not limited to these examples.

A cellular telephone terminal according to the embodiment is a terminal installed with a camera function, and the camera function provides a function that detects the area in which a focal point is obtained (hereinafter, denoted as an in-focus area) for a taken image or an image obtained from outside, cuts the in-focus area thereof out of an original image, and creates a thumbnail image from the cut in-focus area.

Application Stack

Figure 1:
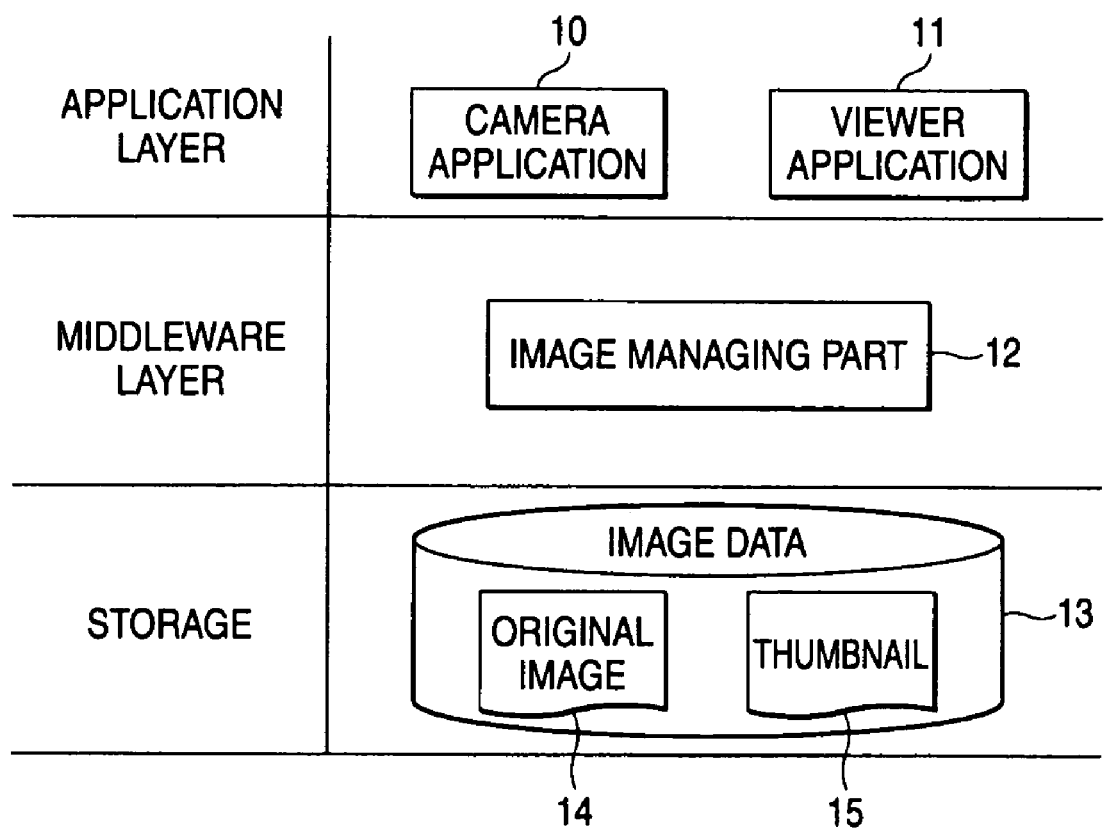
FIG. 1 shows a diagram depicting an application stack of a cellular telephone terminal according to an embodiment of the invention.

FIG. 1 shows an application stack of the cellular telephone terminal according to the embodiment.

In FIG. 1, the cellular telephone terminal according to the embodiment has a camera application 10 and a viewer application 11 as an application layer.

The camera application 10 is the application that uses the camera function provided in the cellular telephone terminal to shoot an image. The camera application 10 is executed to take image data, and the taken image data are stored as an original image 14 in data storage 13 for image data through an image managing part 12 of a middleware. In addition, the data storage 13 is configured to allow storing the image taken by the camera function as well as storing an image obtained from outside, for example, as the original image 14.

The viewer application 11 is the application that executes a browsing process in which the image taken by the camera application 10, the image obtained from outside, and the thumbnail image created by the image managing part 12, described later, are displayed on the screen of a display device provided in the cellular telephone terminal according to the embodiment.

The image managing part 12 exists in the middleware layer, which is the software that runs the image management program according to an embodiment of the invention in which in storing the original image 14 taken by the camera function and the original image 14 obtained from outside in the data storage 13, as described later, the in-focus area is detected based on the data of the original image 14 as well as the in-focus area is cut out to create a thumbnail image 15 from the cut in-focus area. Subsequently, the image managing part 12 stores the thumbnail image 14 in the data storage 13.

In addition, for example, when the viewer application 11 requests the reading of the thumbnail image, the image managing part 12 reads the thumbnail image 14 stored in the data storage 13, and supplies it to the viewer application 11. Thus, on the screen of the display device mounted on the cellular telephone terminal according to the embodiment, the thumbnail image 14 is listed.

Thumbnail Image Creating Process

Hereinafter, a thumbnail image creating process performed in the image managing part 12 will be described.

Figure 2:
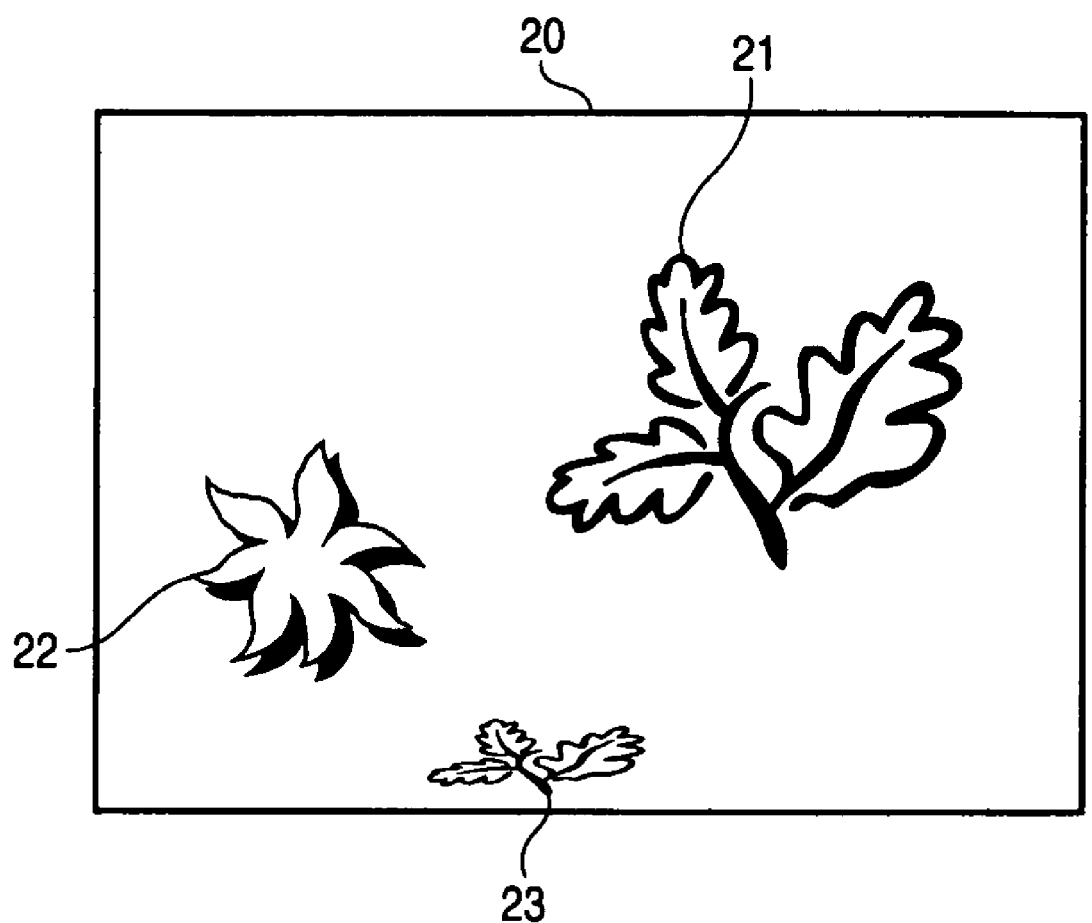
FIG. 2 shows a diagram depicting an exemplary taken original image.

The camera function of the cellular telephone terminal according to the embodiment has a focus control mechanism. Suppose that the focus control mechanism obtains the focal point, and then an original image 20 is taken as shown in FIG. 2, for example. In addition, suppose that among some of subject images 21 to 23 (hereinafter, they are referred to as objects 21 to 23) shown in the original image 20, the target subject that a photographer intends to shoot, that is, the subject on which the focal point is obtained by the focus control mechanism is the object 21. The other objects 22 and 23 are images out of focus as compared with the object 21 which is the focal point obtained for shooting.

Figure 3:
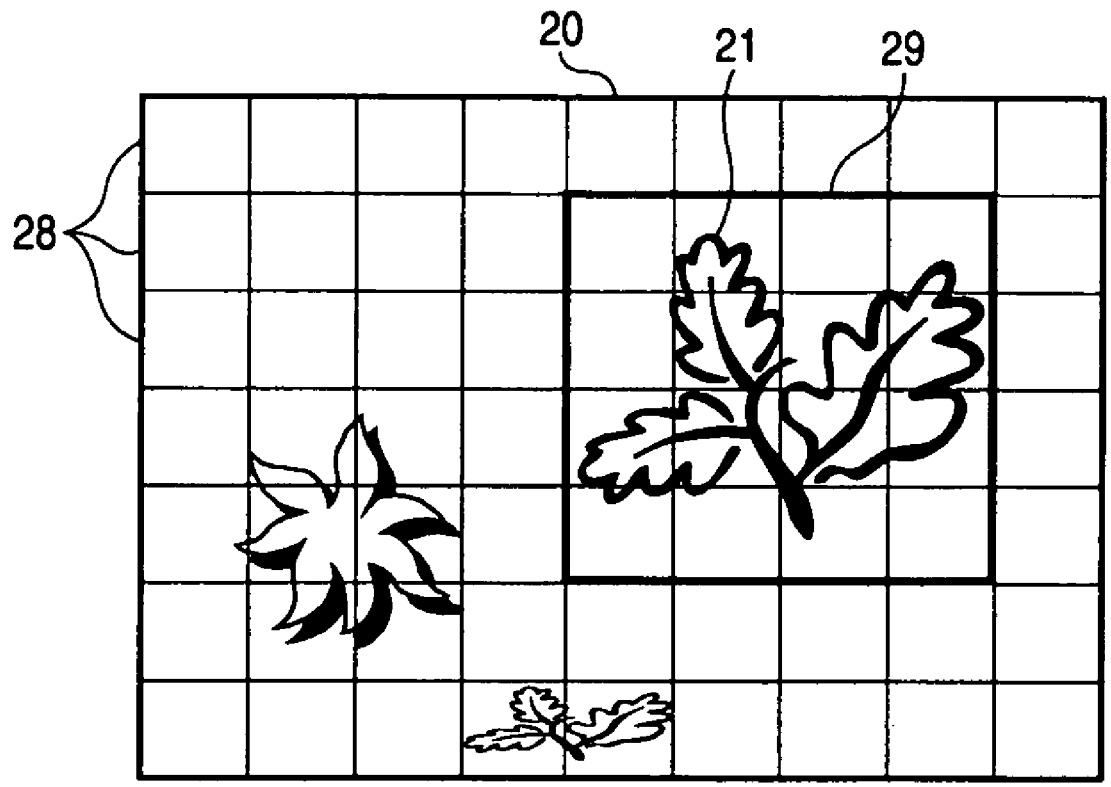
FIG. 3 shows a diagram depicting a state that an original image is divided into a plurality of equal areas and an exemplary thumbnail image cut out of the original image.

In this case, as shown in FIG. 3, the image managing part 12 according to the embodiment divides the original image 20 into a plurality of equal areas 28, and performs predetermined in-focus computation for each of the areas 28 to compute the area in which the focal point is obtained. For the scheme of in-focus computation, there are various schemes. In the embodiment, a modified Laplacian method is used, which is a typical scheme thereof. More specifically, the modified Laplacian method is the scheme in which the focused pixel is expressed by 1 (x, y) to perform a computation as expressed by an Equation (1), whereby an in-focus value is determined.

Equation 1

$$\Delta_M^2 I(x, y) = \left|\frac{\delta^2 I}{\delta x^2}\right| + \left|\frac{\delta^2 I}{\delta y^2}\right| \tag{1}$$

Of course, in the embodiment of the invention, methods other than the modified Laplacian method may be used.

Figure 4:
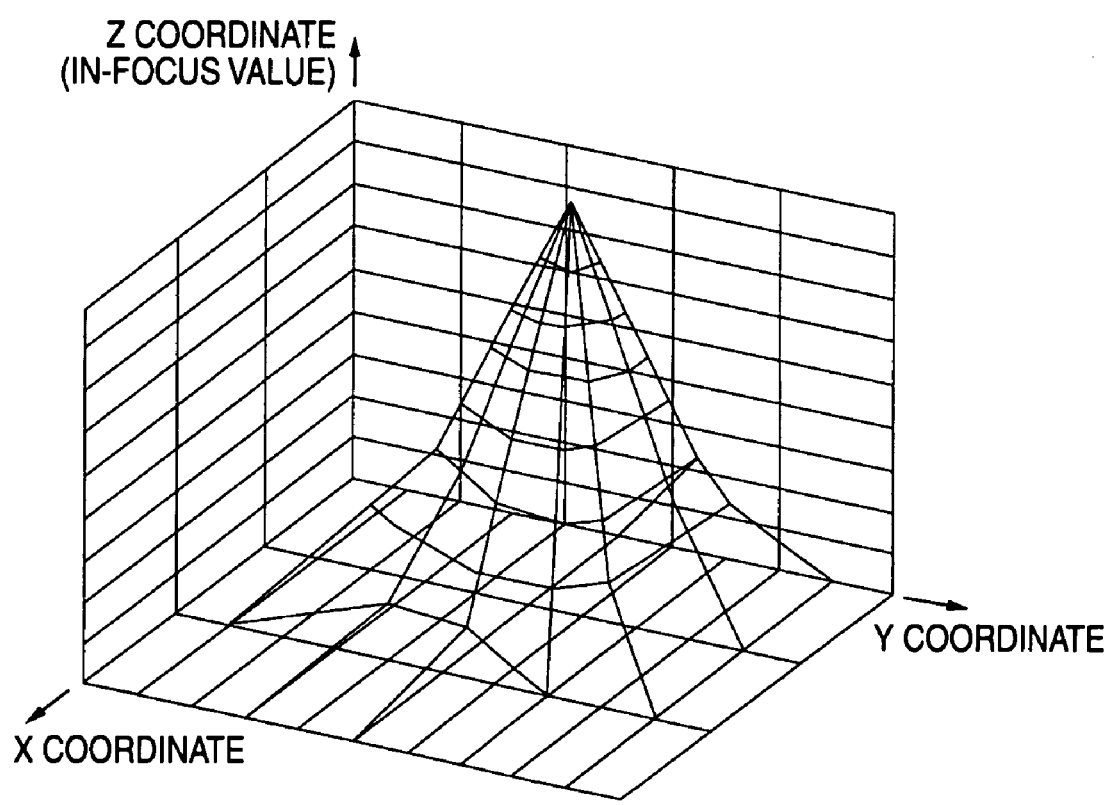
FIG. 4 shows a diagram depicting an exemplary three-dimensional in-focus value distribution obtained from in-focus computation according to a modified Laplacian method.

Here, suppose that as the result of the in-focus computation according to the modified Laplacian method for each of the areas 28 of the original image 20 shown in FIG. 3, for example, a three-dimensional in-focus value distribution is obtained as shown in FIG. 4. More specifically, from the original image 20 shown in FIG. 3, such an in-focus value distribution is obtained that the in-focus value is great in the area including the object 21 that the focal point has obtained for shooting whereas the in-focus value is small in the other areas.

Figure 5:
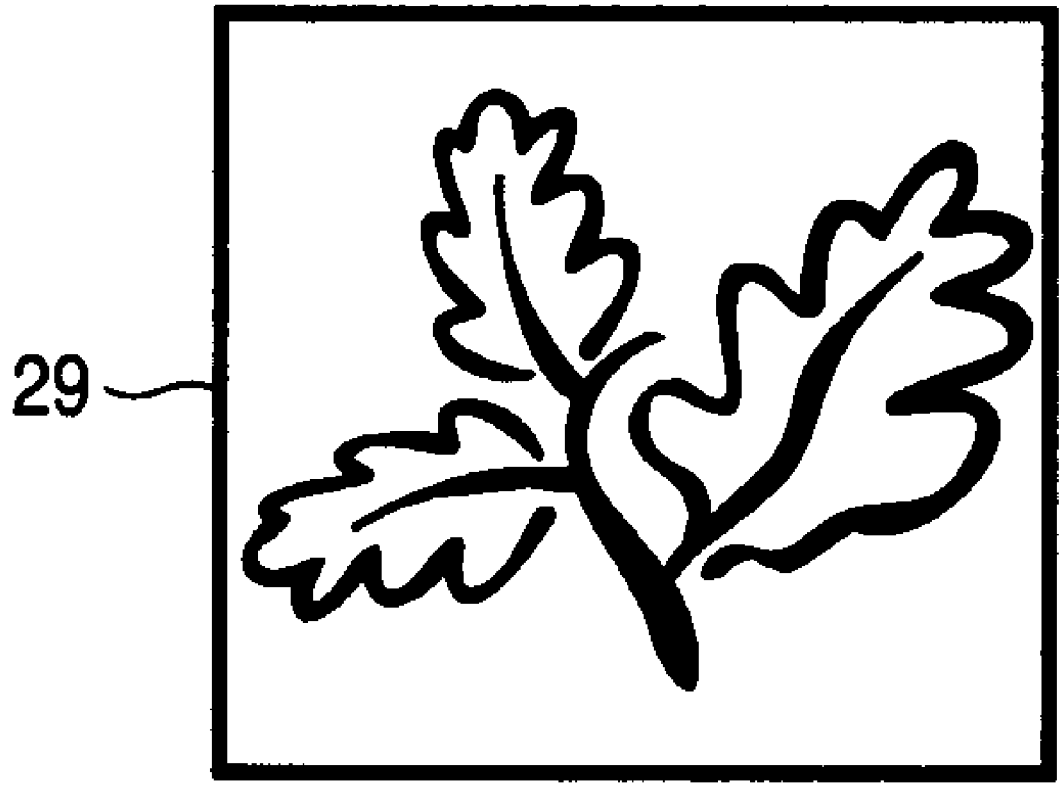
FIG. 5 shows a diagram depicting an exemplary thumbnail image cut out of the original image.

Subsequently, the image managing part 12 compares the in-focus value for each of the areas 28 with a predetermined threshold based on the in-focus value distribution as shown in FIG. 4, and determines only the area in which the in-focus value exceeds the threshold as the in-focus area as well as it cuts the image in a predetermined size including the determined in-focus areas as the thumbnail image. Alternatively, it detects the area having the maximum in-focus value as the in-focus area among the individual areas 28, and cuts the image in a predetermined size including the detected in-focus area as the thumbnail image. More specifically, in the case of the example shown in FIG. 3, the image managing part 12 cuts the image formed of the area (for example, 4×4 area) in a predetermined size including the focused object 21 as a thumbnail image 29 as shown in FIG. 5.

In addition, when the in-focus value distribution above is determined, it may be considered that in the original image, there is a plurality of in-focus areas having almost equal in-focus values dispersedly. In this case, for example, the image managing part 12 is allowed to perform a proper process in accordance with the descriptions of the original image 20 in such a way that it cuts the image in a predetermined size including a closer in-focus area at the center of the original image as a thumbnail image among a plurality of in-focus areas having almost equal in-focus values, or cuts the image in a predetermined size containing some in-focus areas as a thumbnail image among a plurality of in-focus areas having almost equal in-focus values.

Flow Chart of the Thumbnail Image Creating Process

Figure 6:
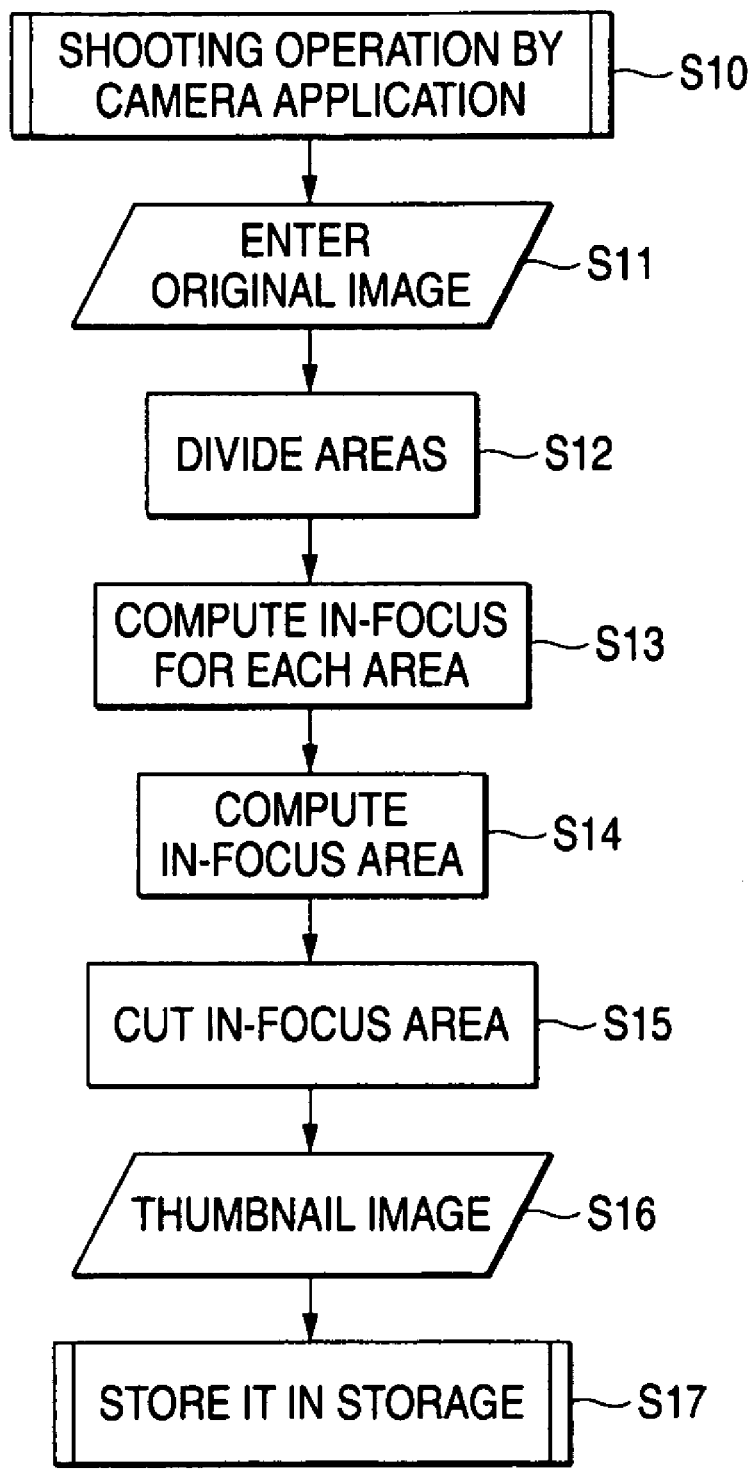
FIG. 6 shows a flow chart depicting the flow of a thumbnail image creating process according to the embodiment.

FIG. 6 shows a flow chart depicting the thumbnail image creating process performed at the image managing part 12.

In FIG. 6, when a shooting function is executed by the camera application 10, for example, at Step S10, and the data of the original image is inputted from the camera application 10 at Step S11, the image managing part 12 divides the original image 20 into a plurality of equal areas 28 in accordance with the image size as the process step at Step S12, as shown in FIG. 3 described above.

Subsequently, as the process step at Step S13, the image managing part 12 performs an in-focus computation for each of the areas 28 according to the modified Laplacian method expressed by the Equation (1), and as the process step at Step S14, it computes the in-focus area according to a comparison process with a predetermined threshold or a detecting process of the maximum in-focus value, as described above.

Subsequently, as the process step at Step S15, the image managing part 12 cuts the image in a predetermined size including the in-focus area determined in the process step at Step S14, and as the process step at Step S16, it then sets the cut image as the thumbnail image 29.

After that, the image managing part 12 stores the thumbnail image 29 in the data storage.

Internal Configuration of the Cellular Telephone Terminal

Figure 7:
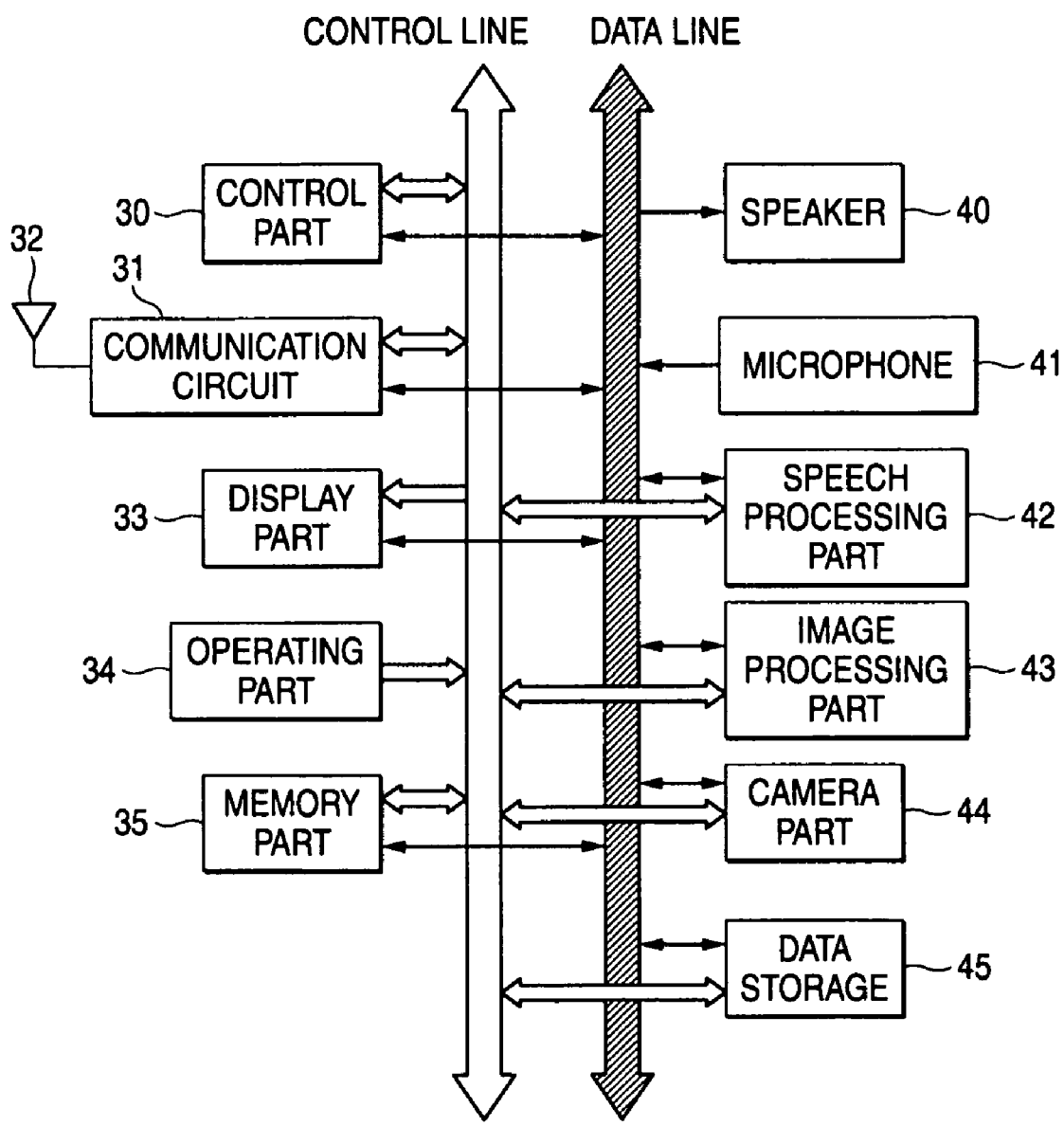
FIG. 7 shows a block diagram schematically depicting the internal configuration of the essential part of the cellular telephone terminal according to the embodiment of the invention.

FIG. 7 shows the schematic internal configuration of the cellular telephone terminal according to the embodiment having the camera function and the thumbnail image creating function, as described above.

In FIG. 7, a data line is a transmission line which transmits various items of data such as sound data, e-mail data and image data.

A control line is a transmission line which transmits various items of control information, such as control data from a control part 30 which is configured of a CPU (central processing unit).

An antenna 32 is an antenna built in the cellular telephone terminal according to the embodiment, which is connected to a communication circuit 31 for use in sending and receiving signal waves.

The communication circuit 31 converts, modulates and demodulates the frequency of sent and received signals.

Here, the sound data of a call received at the antenna 32 and the communication circuit 31 is sent to a speech processing part 42, and the other received data is sent to the control part 30 and processed properly, and then sent to each part from the control part 30 as necessary. In addition, the received data other than the sounds of a call is the data of packet transmission. For example, the flowing data is named such as e-mail data, image data such as moving images and still images, music data, HTML (Hyper Text Markup Language) data, data of program codes, etc.

When the antenna 32 and the communication circuit 31 supply the sound data of a call, the speech processing part 42 decodes the sound data of the call, converts the decoded sound data of the call to an analog sound signal, and sends the analog sound signal to a speaker 40 or to an earphone jack, which is not shown.

The speaker 40 is built in the cellular telephone terminal according to the embodiment, which amplifies the supplied analog sound signal by an internal amplifier, converts the sound signal to audible sounds, and then outputs them outside. Thus, the speaker 40 is for outputting the sounds of the call.

A microphone 41 is built in the embodiment of the cellular telephone terminal, which converts input sounds to an analog sound signal as well as amplifies the analog sound signal by the internal amplifier, and sends the analog sound signal to the speech processing part 42.

When the microphone 41 supplies the sound signal of the call, the speech processing part 42 converts the sound signal of the call to digital sound data and then encodes it, and sends the encoded sound data of the call to the communication circuit 31. Thus, the antenna 32 is for sending the sound signal of the call.

A display part 33 is a display device of the cellular telephone terminal according to the embodiment, which has a display such as a liquid crystal display and a display drive circuit to display images and characters on the screen of the display.

An operating part 34 is formed of a numeric keypad, various buttons and an operation signal generator which generates an operation signal when the keys and buttons are operated.

A camera part 44 corresponds to the camera function provided in the cellular telephone terminal according to the embodiment, which creates data of a still image and a moving image obtained by converting a light figure to an electric signal by an imaging device, and sends the data to an image processing part 43.

Under the control of the control part 30, the image processing part 43 compresses and encodes the image taken at the camera part 44, performs the thumbnail image creating process, stores image data in the data storage 45, and performs decompression and decoding processes for the compressed and encoded image data read out of a data storage 45 or a memory part 35. The image after decompression and decoding and the data of the thumbnail image are sent to the display part 33 through the data line for display. In addition, the control part 30 may perform the thumbnail image creating process.

The memory part 35 includes a RAM (Read Only Memory) and a RAM (Random Access Memory). The ROM stores an OS (Operating System), a control program that the control part 30 controls each part and program codes for performing various functions, image management program codes that the image processing part 43 or the control part 30 performs the thumbnail image creating process, various default values, font data, dictionary data, an incoming call melody and key operating sounds according to the embodiment, various sound data for alarm sounds, program codes for the camera application 10 according to the embodiment, program codes for the viewer application 11, program codes for applications to create and edit e-mail, and program codes for applications to perform various processes for images and sounds, and in addition to these, program codes for various applications mounted on the cellular telephone terminal, and identification information (ID) for the cellular telephone terminal, etc. The ROM includes rewritable ROM, such as a NAND-type flash memory) or EEPROM (Electrically Erasable Programmable Read-Only Memory), which can store e-mail data, data of a telephone book and an e-mail address book, still image data and moving image data (video click data, etc.), key operating sounds, sound data for alarm sounds, character data and registration data for candidate words predictive conversion and learning data for predictive conversion, and in addition to these, various user set values, etc. The RAM stores data at anytime as the working area when the control part 30 processes various data.

The data storage 45 is the storage for image data described in FIG. 1. In addition, the data storage 45 may be included in the memory part 35.

The control part 30 is formed of the CPU, which performs control over the cellular telephone terminal, control for implementing various functions according to the embodiment and various computation based on the OS and various programs stored in the memory part 35.

In addition to this, (not shown in FIG. 7), the cellular telephone terminal according to the embodiment of course has various functions provided on a classic cellular telephone terminal such as a GPS (Global Positioning System) function, a near wireless communication function, a noncontact communication function, a battery, etc.

CONCLUSION

As described above, according to the cellular telephone terminal according to the embodiment of the invention, the in-focus area including the target object that a photographer intends to shoot is cut out of the original image taken by the camera function and the original image obtained from outside, and a thumbnail image can be created. Since the thumbnail image is the image that is a characteristic portion in the original image, thumbnail images can be listed that are easy to see with high browsing and visual recognition properties even on a display device that has a small screen size and relatively low resolution.

In addition, the description of the embodiment is an example of the invention. Therefore, the invention is not limited to the embodiment, which of course can be modified variously depending on the design, for example, without deviating from the teachings of the technical principles of the invention.

The thumbnail image process according to the embodiment is not limited to the image taken by the cellular telephone terminal, which can be adapted to the image taken by other devices, and can be used for general purposes.

It should be understood by those skilled in the art that various modifications combinations, sub-combinations and alterations may occur depending on design requirements and other factors insofar as they are within the scope of the appended claims or the equivalents thereof.

What is claimed is:

1. A portable information terminal comprising:
a display part which has a screen for displaying images;
an in-focus value computing part which computes in-focus values from an original image that has been previously captured by dividing the original image into a plurality of divided areas and computing an in-focus value for each of the plurality of divided areas;
an image cutting part which cuts a thumbnail image from the original image based on the in-focus values computed by the in-focus value computing part, by comparing the in-focus value for each of the plurality of divided areas with a predetermined threshold based on an in-focus value distribution, detecting an area having an in-focus value exceeding the predetermined threshold as an in-focus area, and cutting an image in a predetermined size including the in-focus area out of the original image to set it as the thumbnail image;
a data storage part which stores data of the thumbnail image cut at the image cutting part; and
a control part which reads the data of the thumbnail image stored in the data storage part for display on the screen.

2. The portable information terminal according to claim 1, wherein the image cutting part detects an area having a maximum in-focus value as the in-focus area.

3. The portable information terminal according to claim 1, wherein the image cutting part detects a plurality of in-focus areas in the original image, and selects the in-focus area to be set as the thumbnail image based upon criteria other than the in-focus value.

4. The portable information terminal according to claim 1, wherein the image cutting part detects a plurality of in-focus areas in the original image, and selects the in-focus area that is closest to the center of the original image to be set as the thumbnail image.

5. The portable information terminal according to claim 1, wherein the original image is received from an outside source and stored in the data storage part prior to computing the in-focus value for each of the plurality of divided areas.

6. The portable information terminal according to claim 1, wherein each of the plurality of divided areas are of equal size.

7. The portable information terminal according to claim 1, wherein the in-focus value computing part computes the in-focus value by modified Laplacian computation.

8. A computer program product for cutting thumbnail images for display on a screen of a display unit, the computer program product comprising a non-transitory computer readable medium storing program code that is executable to provide operations comprising:
computing in-focus values from an original image that has been previously captured by dividing the original image into a plurality of divided areas and computing an in-focus value for each of the plurality of divided areas;
cutting a thumbnail image from the original image based on the computed in-focus values, by comparing the in-focus value for each of the plurality of divided areas with a predetermined threshold based on an in-focus value distribution, detecting an area having an in-focus value exceeding the predetermined threshold as an in-focus area, and cutting an image in a predetermined size including the in-focus area out of the original image to set it as the thumbnail image;
storing data of the thumbnail image cut at the image cutting part; and
reading the stored data of the thumbnail image for display on the screen.

9. The computer program product according to claim 8, wherein cutting the thumbnail image comprises detecting an area having a maximum in-focus value as the in-focus area.

10. The computer program product according to claim 8, wherein cutting the thumbnail image comprises detecting a plurality of in-focus areas in the original image, and selecting the in-focus area to be set as the thumbnail image based upon criteria other than the in-focus value.

11. The computer program product according to claim 8, wherein cutting the thumbnail image comprises detecting a plurality of in-focus areas in the original image, and selecting the in-focus area that is closest to the center of the original image to be set as the thumbnail image.

12. The computer program product according to claim 8, wherein the original image is received from an outside source and is stored in memory prior to computing the in-focus value for each of the plurality of divided areas.

13. The computer program product according to claim 8, wherein each of the plurality of divided areas are of equal size.

14. The computer program product according to claim 8, wherein computing the in-focus values comprises computing by modified Laplacian computation.

15. A method for cutting thumbnail images for display on a screen of a display unit, the method comprising:
   computing in-focus values from an original image that has been previously captured by dividing the original image into a plurality of divided areas and computing an in-focus value for each of the plurality of divided areas;
   cutting a thumbnail image from the original image based on the computed in-focus values, by comparing the in-focus value for each of the plurality of divided areas with a predetermined threshold based on an in-focus value distribution, detecting an area having an in-focus value exceeding the predetermined threshold as an in-focus area, and cutting an image in a predetermined size including the in-focus area out of the original image to set it as the thumbnail image;
   storing data of the thumbnail image cut at the image cutting part; and
   reading the stored data of the thumbnail image for display on the screen.

16. The method according to claim 15, wherein cutting the thumbnail image comprises detecting an area having a maximum in-focus value as the in-focus area.

17. The method according to claim 15, wherein cutting the thumbnail image comprises detecting a plurality of in-focus areas in the original image, and selecting the in-focus area to be set as the thumbnail image based upon criteria other than the in-focus value.

18. The method according to claim 15, wherein cutting the thumbnail image comprises detecting a plurality of in-focus areas in the original image, and selecting the in-focus area that is closest to the center of the original image to be set as the thumbnail image.

19. The method according to claim 15, wherein the original image is received from an outside source and is stored in memory prior to computing the in-focus value for each of the plurality of divided areas.

20. The method according to claim 15, wherein each of the plurality of divided areas are of equal size.

21. The method according to claim 15, wherein computing the in-focus values comprises computing by modified Laplacian computation.

* * * * *